(12) United States Patent
Campbell et al.

(10) Patent No.: US 8,629,625 B2
(45) Date of Patent: Jan. 14, 2014

(54) METHOD AND APPARATUS PROVIDING UNIVERSAL VOLTAGE INPUT FOR SOLID STATE LIGHT FIXTURES

(75) Inventors: Gregory Campbell, Quincy, MA (US); Igor Shikh, Newton Center, MA (US)

(73) Assignee: Koninklijke Philips N.V., Eindhoven (NL)

( * ) Notice: Subject to any disclaimer, the term of this patent is extended or adjusted under 35 U.S.C. 154(b) by 157 days.

(21) Appl. No.: 13/391,306

(22) PCT Filed: Jul. 23, 2010

(86) PCT No.: PCT/IB2010/053367
§ 371 (c)(1),
(2), (4) Date: Feb. 20, 2012

(87) PCT Pub. No.: WO2011/021120
PCT Pub. Date: Feb. 24, 2011

(65) Prior Publication Data
US 2012/0146529 A1    Jun. 14, 2012

Related U.S. Application Data

(60) Provisional application No. 61/234,777, filed on Aug. 18, 2009.

(51) Int. Cl.
H05B 41/16    (2006.01)
H05B 41/24    (2006.01)

(52) U.S. Cl.
USPC ......... 315/246; 315/174; 315/209 R; 315/247

(58) Field of Classification Search
None
See application file for complete search history.

(56) References Cited

U.S. PATENT DOCUMENTS

| 5,847,942 | A | 12/1998 | Bazinet et al. |
| 8,410,717 | B2 * | 4/2013 | Shteynberg et al. .......... 315/291 |
| 2008/0252233 | A1 | 10/2008 | Wu |
| 2012/0235585 | A1 * | 9/2012 | Lys et al. .................. 315/200 R |

FOREIGN PATENT DOCUMENTS

| WO | 2004070928 A1 | 8/2004 |
| WO | 2005029925 A1 | 3/2005 |

* cited by examiner

*Primary Examiner* — Anh Tran
(74) *Attorney, Agent, or Firm* — Yuliya Mathis

(57) ABSTRACT

A method for providing universal voltage input to a solid state lighting fixture (140) supplied by an AC line voltage includes converting an analog voltage signal corresponding to the line voltage to digital values indicating a waveform of the line voltage (S312) and calculating slopes corresponding to rising edges of the waveform using select values of the digital values (S453). A value of the line voltage is determined based on the calculated slopes (S458).

20 Claims, 7 Drawing Sheets

METHOD AND APPARATUS PROVIDING UNIVERSAL VOLTAGE INPUT FOR SOLID STATE LIGHT FIXTURES

TECHNICAL FIELD

The present invention is directed generally to control of solid state lighting fixtures. More particularly, various inventive methods and apparatuses disclosed herein relate to providing universal voltage input to solid state lighting fixtures for various power supply line voltages.

BACKGROUND

Digital or solid state lighting technologies, i.e., illumination based on semiconductor light sources, such as light-emitting diodes (LEDs), offer a viable alternative to traditional fluorescent, high-intensity discharge (HID), and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

Some of the fixtures embodying these sources feature a lighting module, including one or more LEDs capable of producing white light and/or different colors of light, e.g., red, green and blue, as well as a controller or processor for independently controlling the output of the LEDs in order to generate a variety of colors and color-changing lighting effects, for example, as discussed in detail in U.S. Pat. Nos. 6,016,038 and 6,211,626, incorporated herein by reference. LED technology now enables line voltage powered white light fixtures, such as the EssentialWhite™ series available from Philips Color Kinetics. These fixtures may be dimmable using trailing edge dimmer technology, such as electric low voltage (ELV) type dimmers for 120VAC line voltages.

However, conventional solid state white light fixtures, including LED white light fixtures, are input voltage dependent. Thus, the various types of solid state white light fixtures operate only at specific line voltages for which they are respectively designed. The value and frequency of the line voltages may differ, depending on various factors, such as geographic location of the user (e.g., U.S. markets typically require a 120VAC, 60 Hz line voltage while European markets typically require a 230VAC, 50 Hz line voltage) and physical location of the installed solid state white light fixture (e.g., fixtures installed in high alcoves typically require 277VAC line voltage while fixtures installed in under-cabinet environments typically require 120VAC line voltage).

Such operational differences among the various types solid state white light fixtures cause confusion and practical inefficiencies for manufacturers and users. For example, electrical contractors typically must have multiple sets of inventory on hand corresponding to the number of different line voltages available in a particular construction project. The sets of inventory must be carefully managed through installation, or new LED white light fixtures may be ruined by application of an incorrect input line voltage. In addition, while LED white light fixtures designed to run at different input line voltages may have the same printed circuit boards, other components differ based on design differences needed to accommodate operation at 100VAC, 120VAC, 230VAC or 277VAC input line voltages, for example. This is inefficient from a supply chain and manufacturing perspective, since each input line voltage requires its own custom bill of materials, stock keeping units, and the like. Managing this has proved troublesome, as it is difficult to forecast demand. Therefore, marketing, supply chain and manufacturing would benefit from an LED white light or other solid state lighting fixture having a universal voltage input.

SUMMARY

The present disclosure is directed to inventive methods and devices for providing universal voltage input to solid state lighting fixtures for operations at various power supply voltages. Applicants have recognized and appreciated that it would be beneficial to provide power universally for solid state lighting fixtures using various different input AC line voltages, such as 100VAC, 120VAC, 230VAC and 277VAC.

Generally, in one aspect, a method provides for universal voltage input to a solid state lighting fixture supplied by an AC line voltage. The method includes converting an analog voltage signal corresponding to the line voltage to digital values indicating a waveform of the line voltage and calculating slopes corresponding to rising edges of the waveform using select values of the digital values. A value of the line voltage is determined based on the calculated slopes.

In another aspect, a device provides for universal voltage input to a solid state lighting fixture having multiple light-emitting diodes (LEDs). The device includes an analog-to-digital converter and a processor. The analog-to-digital converter is configured to receive an analog voltage signal corresponding to an AC line voltage signal having a waveform and to convert the analog voltage signal to digital values indicating the waveform, The processor is configured to execute an algorithm for reading select digital values provided by the analog-to-digital converter corresponding to a rising edge of the waveform, calculating a slope based on the select digital values, and determining a value of the line voltage based on the calculated slope.

In another aspect, a computer-readable medium stores a program, executable by a computer processor, for providing universal voltage input to a solid state lighting fixture supplied by an AC line voltage. The computer readable medium includes a receiving code segment for receiving digital values indicating a waveform of the line voltage; a calculating code segment for calculating slopes corresponding to rising edges of the waveform using select values of the digital values; a determining code segment for determining a value of the line voltage based on the calculated slopes; and a control signal code segment for adjusting a control signal based on the determined value of the line voltage, the control signal adjusting a power provided to the solid state lighting fixture.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., LED white light fixture) may include a number of dies which respectively emit different spectra of electroluminescence that, in combination, mix to form essentially white light. In another implementation, an LED white light fixture may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white light LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light or illumination sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor and/or controller may be associated with one or more storage media (generically referred to herein as "memory," e.g., volatile and non-volatile computer memory such as random-access memory (RAM), read-only memory (ROM), programmable read-only memory (PROM), electrically programmable read-only memory (EPROM), electrically erasable and programmable read only memory (EEPROM), universal serial bus (USB) drive, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Figure 1:
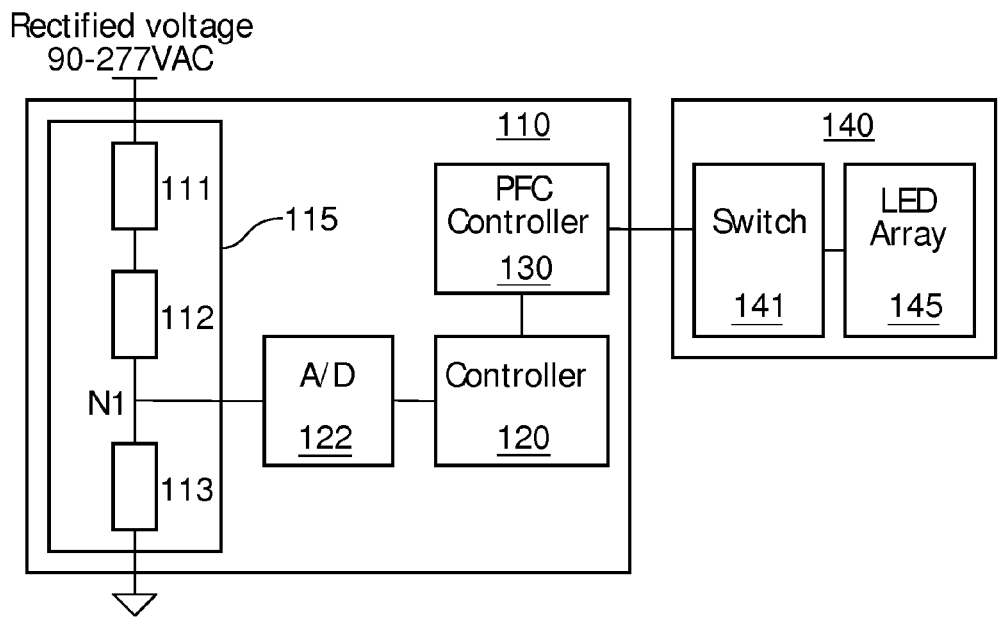
FIG. 1 is a block diagram showing a lighting system, including a solid state light fixture and an input voltage controller, according to a representative embodiment.

FIG. 1 is a block diagram showing a lighting system, including a solid state light fixture and an input voltage controller, according to a representative embodiment. Referring to FIG. 1, in some embodiments, input voltage controller 110 includes voltage divider 115, analog-to-digital (A/D) converter 122, controller 120 and transition mode power factor correction (PFC) controller 130. The voltage divider 115 receives rectified voltage from a power source. Generally, the rectified voltage is an AC line voltage signal having a voltage value, e.g., between about 90VAC and about 277VAC, and a corresponding waveform. The AC line voltage signal is used to power the solid state light fixture 140. The voltage divider 115 provides a DC voltage signal corresponding to the rectified AC line voltage signal, within a range of about 0VDC to about 5VDC, for example. The DC voltage signal is provided to the A/D converter 122 as an analog input voltage signal.

In the embodiment depicted in FIG. 1, the voltage divider 115 includes first and second resistors 111 and 112 connected in series between the rectified AC line voltage source and node N1, which is connected to an input of the controller 120. The voltage divider 115 further includes third resistor 113 connected between node N1 and ground. In an embodiment, the first and second resistors 111 and 112 each have a resistance of about 750 kΩ, and the third resistor 113 has a resistance of about 13 kΩ. It is understood that, in other embodiments, the resistance values of the first through third resistors 111-113 and/or the configuration of the voltage divider 115 may vary to provide unique benefits for any particular situation or to meet application specific design requirements of various implementations, as would be apparent to one skilled in the art.

The A/D converter 122 receives the analog input voltage signal from the voltage divider 115, converts the analog input voltage signal to digital values indicating the waveform of the rectified AC line voltage. The controller 120 receives the digital values from the A/D converter 122 and determines the voltage level of the AC line voltage based on the digital values. The controller 120 adjusts a control signal based on the determined voltage level of the AC line voltage, and outputs the control signal to the PFC controller 130 to control the solid state light fixture 140. For example, based on the control signal, the PFC controller 130 outputs a power modulation control signal to run the solid state light fixture 140 at a steady state of 30 W for any detected value of the AC line voltage (e.g., 120VAC, 230VAC or 277VAC), as discussed below.

The controller 120 may be constructed of any combination of hardware, firmware or software architectures, as discussed above, without departing from the scope of the present teachings. Also, the controller 120 may include its own memory (e.g., nonvolatile memory) for storing executable software/firmware executable code that allows it to perform the various functions of the voltage controller 110. For example, in various embodiments, the controller 120 may implemented as a microprocessor, ASIC, FPGA, microcontroller, such as a PIC16F882 microcontroller available from Microchip Technology, Inc., or the like. Likewise, the PFC controller 130 may be constructed of any combination of hardware, firmware or software architectures, without departing from the scope of the present teachings. For example, in various embodiments, the PFC controller 130 may implemented as a microprocessor, ASIC, FPGA, microcontroller, such as an L6562 PFC controller, available from ST Microelectronics, or the like. In addition, although depicted separately, it is understood that the A/D converter 122 and/or the PFC controller 130, and associated functionality, may be incorporated within the controller 120 in various embodiments.

Figure 2:
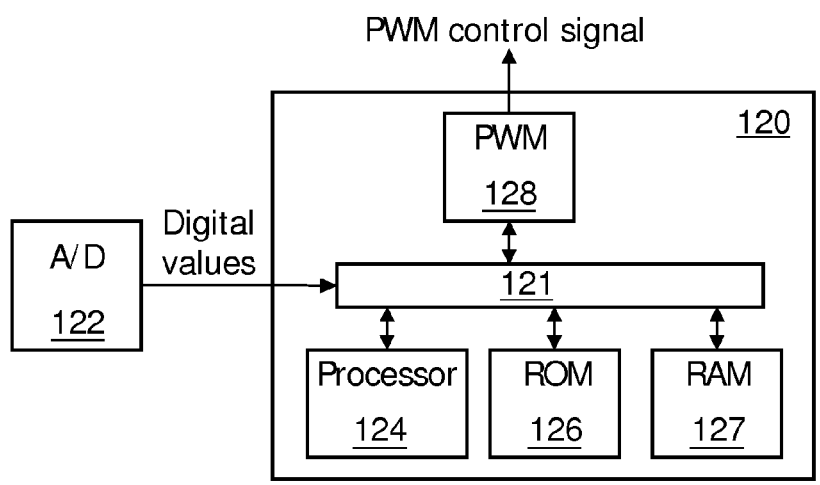
FIG. 2 is a block diagram of a controller for an input voltage controller, according to a representative embodiment.

FIG. 2 is a block diagram of controller 120, according to a representative embodiment. Referring to FIG. 2, the controller 120 includes processor 124, read-only memory (ROM) 126, random-access memory (RAM) 127 and PWM signal generator 128.

As discussed above, the A/D converter 122 receives the input DC voltage signal from the voltage divider 115, and converts the input DC voltage signal to digital values, indicating the waveform of the rectified AC line voltage. The digital values are received by the processor 124 for processing, and also may be stored in ROM 126 and/or RAM 127, e.g., via bus 121. The processor 124 may include its own memory (e.g., nonvolatile memory) for storing executable software/firmware executable code that allows it to perform the various functions of the voltage controller 110. Alternatively, the executable code may be stored in designated memory locations within ROM 126 and/or RAM 127. The ROM 126 may include any number, type and combination of tangible computer readable storage media, such as PROM, EPROM, EEPROM, and the like. Further, the ROM 126 and/or RAM 127 may store statistical data and results of previous AC line voltage calculations by the processor 124, for example.

The PWM signal generator 128 generates and outputs a pulse wave modulated (PWM) signal as the control signal, in response to instructions or control signals from the processor 124. More particularly, in the depicted embodiment, the PWM signal generator 128 varies the pulse width of the PWM control signals depending on the value of the AC line voltage determined by the processor 124. For example, the PWM signal generator 128 may generate PWM control signals having shorter pulse widths in response to higher values of the AC line voltage. The PWM control signal is output from the controller 120 to the PFC controller 130, which controls power modulation of the solid state light fixture 140 in accordance with the pulse widths of the PWM control signal. For example, the PFC controller 130 may be configured to increase current to the solid state lighting fixture 140 in response to larger pulse widths, thus maintaining a constant power for lower voltage values (e.g., 120VAC). Likewise, the PFC controller 130 may be configured to decrease current to the solid state lighting fixture 140 in response to shorter pulse widths, thus maintaining a constant power for higher voltage values (e.g., 277VAC).

For example, in some embodiments, the PFC controller 130 has a dedicated current setting pin on its device. By setting a voltage reference on the current setting pin, the PFC controller 130 will output a PWM signal to the solid state light fixture 140 with a pulse width that is related to the voltage reference seen on the current setting pin. The PWM control signal output from the controller 120 (with altering pulse width, depending on the input voltage waveform) goes through a filter circuit (not shown) in the PFC controller 130 and effectively changes the voltage reference on the current setting pin of the PFC controller 130. This allows the change in overall power going through LEDs in an LED array 145 of the solid state light fixture 140. Of course, other types of control signals and methods of controlling the solid state light fixture 140 may be incorporated within the scope of the present teachings.

Referring again to FIG. 1, the solid state light fixture 140 may be one of light fixtures of EssentialWhite™ series available from Philips Color Kinetics. The solid state light fixture 140 includes a switch 141 and a light source or illumination source, such as the representative LED array 145. The switch 141 switches power to the LED array 145 on and off in response to the power modulation control signal received from the PFC controller 130, which concurrently changes the steady state current. For example, the amount of "on" time may determine the amount of current through the LEDs of LED array 145. The timing or cycle of switching the power to the LED array 145 thus adjusts for the various values of the AC line voltage. For example, a higher AC line voltage (e.g., 277VAC) would require shorter "on" intervals (resulting in less current) to provide steady state power (e.g., 30 W) to the LED array 145 than a lower AC line voltage (e.g., 120VAC).

Figure 3:
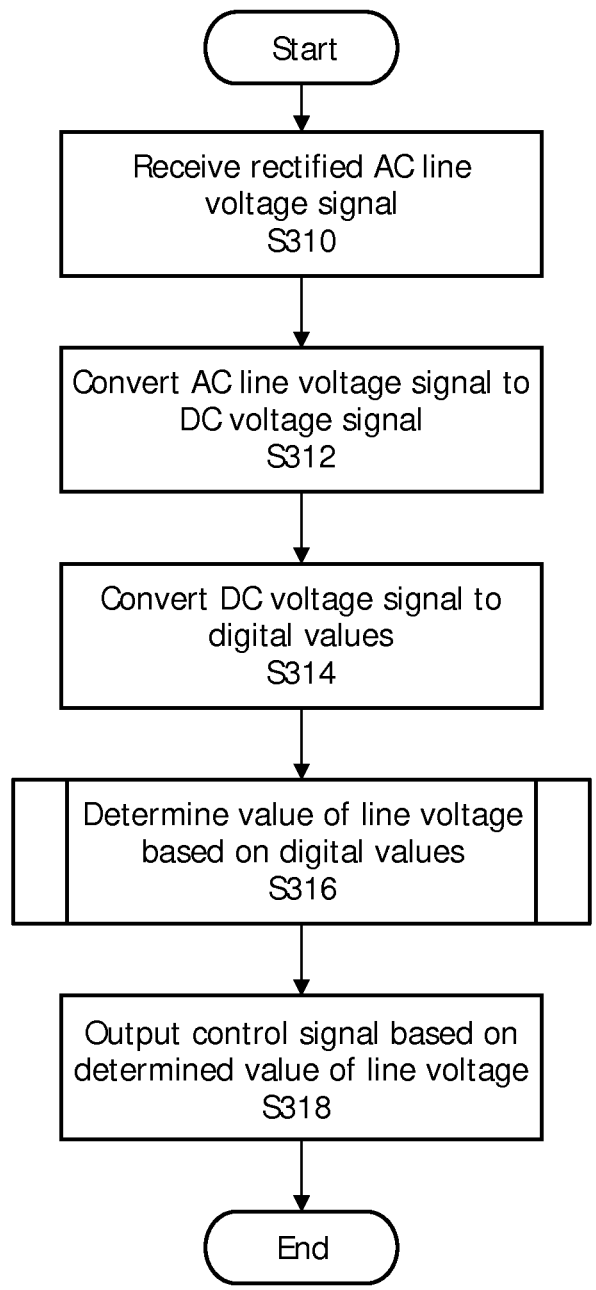
FIG. 3 is a flow diagram showing a process of controlling power of a solid state lighting fixture, according to a representative embodiment.

FIG. 3 is a flow diagram showing a process of controlling power of a solid state lighting fixture, according to a representative embodiment. The various steps and/or operations depicted in FIG. 3 may be implemented by the A/D converter 122 and the controller 120, for example, discussed above with reference to FIGS. 1 and 2.

In step S310, a rectified AC line voltage signal is received for powering the solid state light fixture. The magnitude or value of the AC line voltage signal is not known, and may be any one of various available AC line voltages, such as 120VAC, 230VAC or 277VAC. In step S312, the AC line voltage signal is converted to a DC voltage signal, e.g., by voltage divider 115, which provides DC voltage levels corresponding to a waveform of the AC line voltage signal. The DC voltage signal is converted from analog to digital, e.g., by A/D converter 122, in step S314 to provide digital values representing the waveform of the AC line voltage signal.

In operation S316, the magnitude or value of the AC line voltage signal is determined, e.g., by controller 120 and/or processor 124, using the digital values, described in more detail with reference to FIGS. 4-6, below. Generally, a peak detect algorithm is executed to determine whether the AC line voltage has a high or intermediate value (e.g., 277VAC or 220-240VAC). However, the peak detection algorithm alone may not be able to detect the value of the AC line voltage, for example, when the AC line voltage has a low value (e.g., 120VAC) or when the AC line voltage signal has an intermediate value (e.g., 230VAC) that has been dimmed. When the peak detect algorithm is not able to detect the value of the AC line voltage, a slope detection algorithm is performed to determined whether a slope of a rising edge of the AC line voltage signal waveform corresponds to the low value or intermediate value.

After the value of the AC line voltage is determined, a control signal is generated and output, e.g., to PFC controller 130, based on the determined value, in step S318. Based on the control signal, power modulation of the solid state lighting fixture is adjusted to account for the AC line voltage value.

Figure 4:
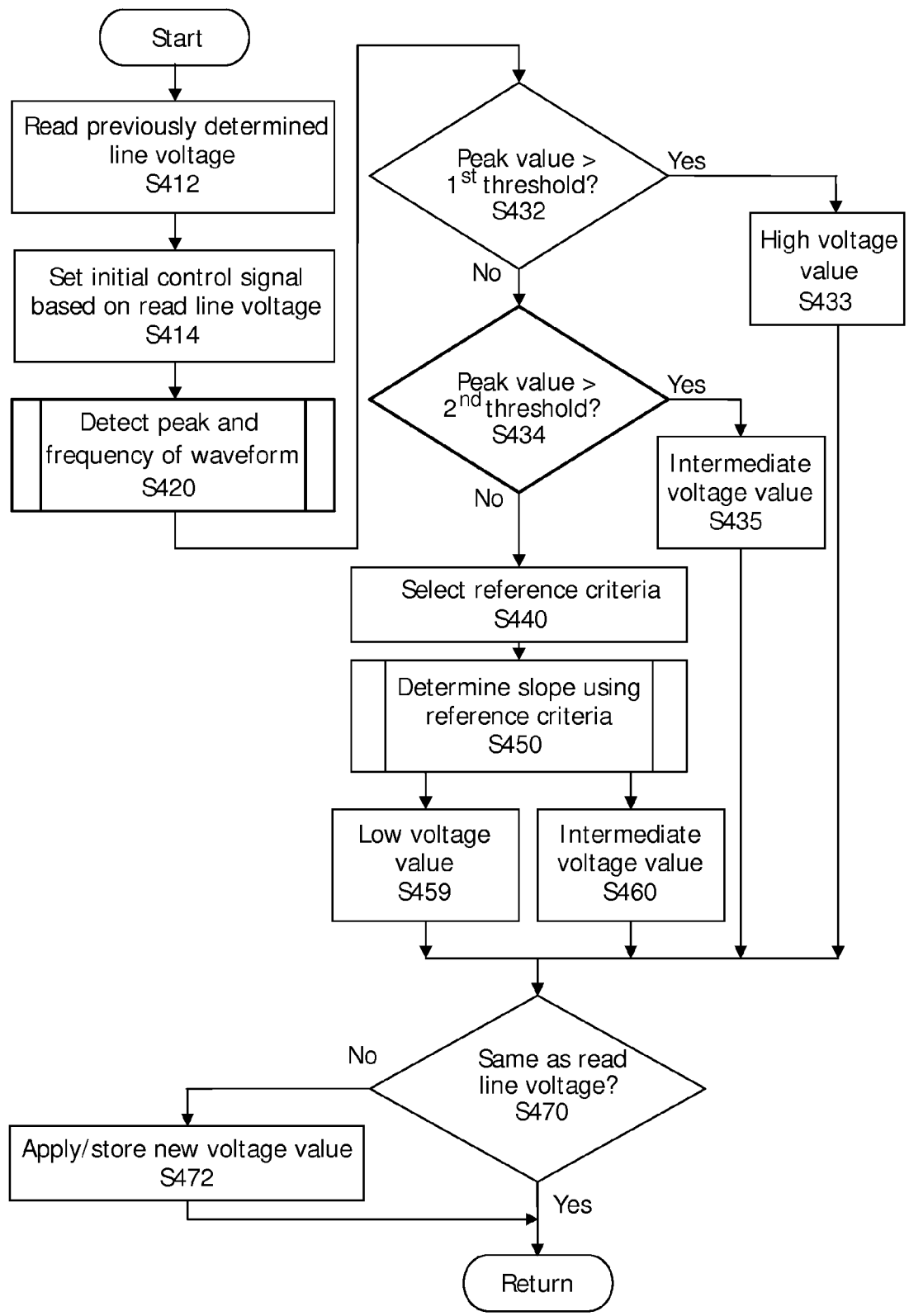
FIG. 4 is a flow diagram showing a process of determining a voltage value of an AC line voltage signal, according to a representative embodiment.

FIG. 4 is a flow diagram showing a process of determining the value of AC line voltage signal, according to a representative embodiment.

Referring to FIG. 4, the process is first initialized, indicated for example by steps S412 and S414. In an embodiment, the initialization is performed only upon powering up the solid state lighting fixture, although the initialization may be omitted entirely or performed at other times within the process of determining the value of the AC line voltage in alternative embodiments, without departing from the scope of the present teachings. When available, a previously determined AC line voltage value is retrieved from memory in step S412, and the control signal, e.g., output by the controller 120, is initially set based on the previously determined AC line voltage value in step S414. If the control signal is a PWM control signal, for instance, the PWM pulse width or duty cycle is initially set according to the previously determined AC line voltage value. For example, the value of the AC line voltage may be determined and stored, e.g., in ROM 126, every time the solid state light fixture is turned on. Accordingly, the solid state lighting fixture is operated at the previously determined value of the AC line voltage while the present value of the AC line voltage is being determined. This prevents flickering or other adverse affects during the determination process.

In operation S420, a peak detection algorithm is performed in order to detect peaks and frequency of the AC line voltage signal, based on the digital values, e.g., provided by A/D converter 122. The peak detection algorithm of operation S420 is discussed in detail with reference to FIG. 5, which is a flow diagram showing a process of determining signal peaks and frequency of the AC line voltage signal, according to a representative embodiment.

Figure 5:
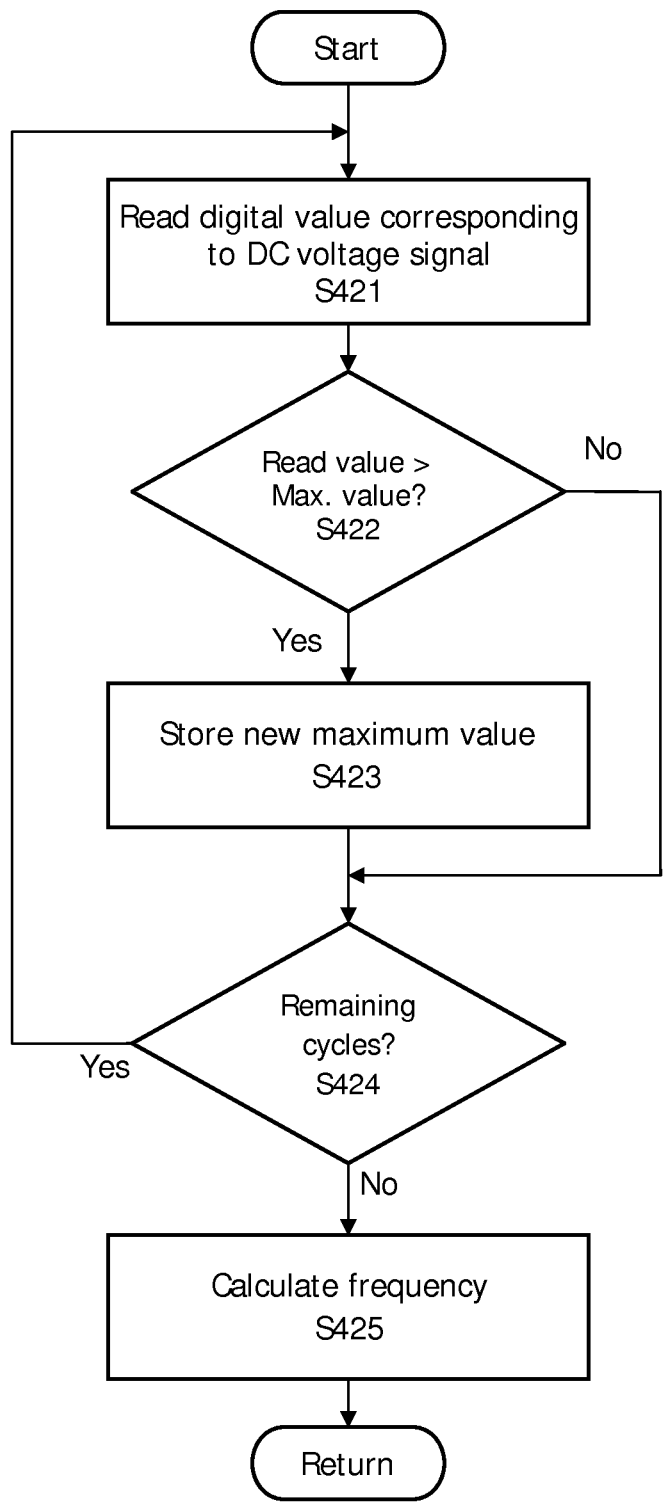
FIG. 5 is a flow diagram showing a process of detecting peaks of an AC line voltage signal waveform, according to a representative embodiment.

Referring to FIG. 5, digital values of the DC voltage signals are read during a predetermined number of cycles (e.g., 20 cycles) or for a predetermined period of time (e.g., 150 mS) in order to identify and store the maximum digital values (corresponding to peaks of the AC line voltage signal waveform) and/or to identify the frequency of the AC line voltage signal. For example, the processor 124 may sample a number of digital values of the DC voltage signal from the A/D converter 122. In order to identify the maximum digital values, a digital value of the DC voltage signal is read in step S421 and compared to a maximum value in step S422. The maximum value may be a predetermined threshold value or a stored digital value that was previously determined to be the maximum value from among previously read digital values.

When the read digital value is greater than the maximum value (step S422: Yes), the read digital value is stored as the new maximum value in step S423, to be used in comparisons with subsequently read digital values. When the read digital value is not greater than the maximum value (step S422: No), step S423 is skipped, and it is determined in step S424 whether additional cycles (or time) remain for reading digital values. For example, the number of cycles or elapsed time may be compared to a predetermined threshold or a predetermined time period, respectively, for reading the digital values. When there are additional cycles or time (step S424: Yes), steps S421 through S423 are repeated. When there are no additional cycles or time for reading the digital values (step S424: No), the current maximum value among the sampled digital values is deemed the peak value of the waveform.

The frequency of the waveform of the AC line voltage is calculated in step S425. For example, it is determined in step S425 whether the AC line voltage is 50 Hz or 60 Hz, which is typically dictated by the geographic location of the solid state light fixture installation. The frequency of the waveform is determined since it directly influences the slope of the waveform, which is calculated in operation S450 of FIG. 4, discussed below. In an embodiment, the frequency of the waveform may be determined by sampling a point on waves of the waveform (e.g., peaks or starting points of the waves) over a period of cycles and calculating the amount of time between adjacent waves.

After determining the frequency in step S425 of FIG. 5, the process returns to FIG. 4. In steps S432-S435 of FIG. 4, it is determined whether the value of the AC line voltage signal can be determined without having to determine the slope of the corresponding waveform. In particular, in step s432, the peak value of the waveform is compared to a predetermined first threshold value to determine whether the value of the AC line voltage signal is a maximum voltage value (e.g., 277VAC). When the peak value is greater than the first threshold value (step S432: Yes), it is determined that the value of the AC line voltage signal is the maximum voltage value in step S433.

When the peak value is not greater than the first threshold value (step S432: No), the process proceeds to step S434, in which the peak value of the waveform is compared to a predetermined second threshold value to determine whether the value of the AC line voltage signal is an intermediate voltage value (e.g., 230VAC) or a range of possible intermediate voltage values (e.g., 220VAC-240VAC). When the peak value is greater than the second threshold value (step S434: Yes), it is determined that the value of the AC line voltage signal is the intermediate voltage value (or the range of possible intermediate voltage values) in step S435.

When the peak value is not greater than the second threshold value (step S434: No), the process determines the value of the AC line voltage signal based on the slope of the waveform. That is, when the peak value is not greater than the second threshold value, the AC line voltage signal may be either a low voltage value (e.g., 120VAC) or a dimmed intermediate voltage value (e.g., 230VAC), which conditions are otherwise indistinguishable based solely on peak value determination.

Figure 7A:
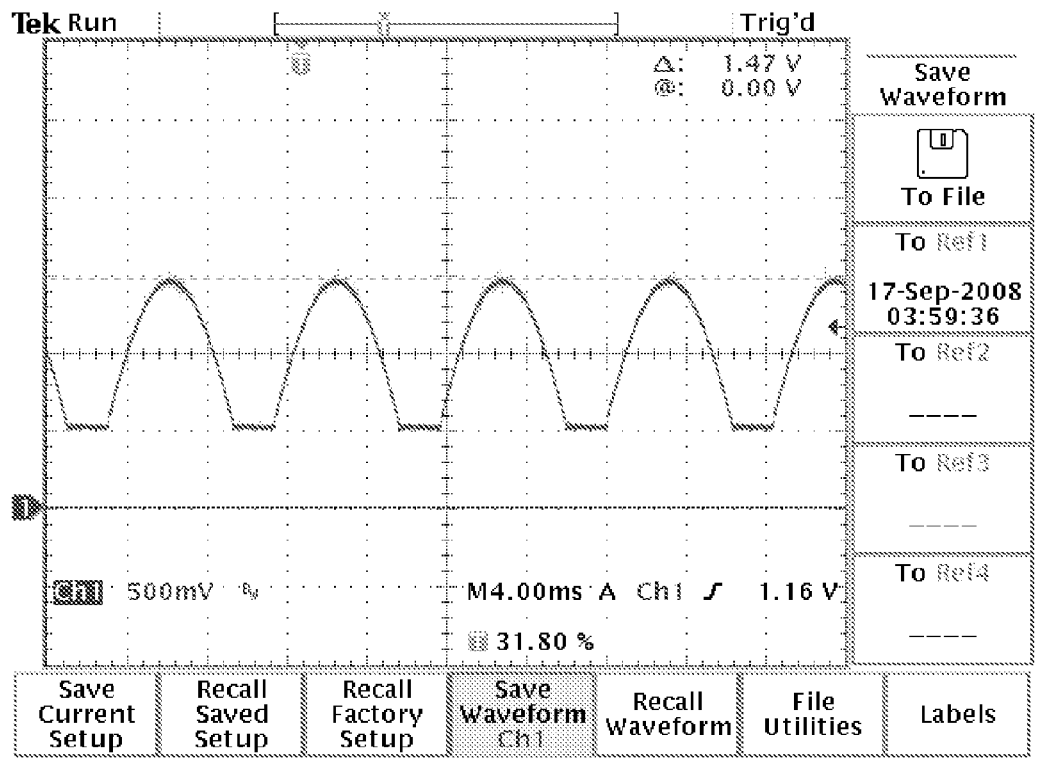
FIGS. 7A and 7B are sample traces of waveforms of undimmed and dimmed AC line voltage signals.
Figure 7B:
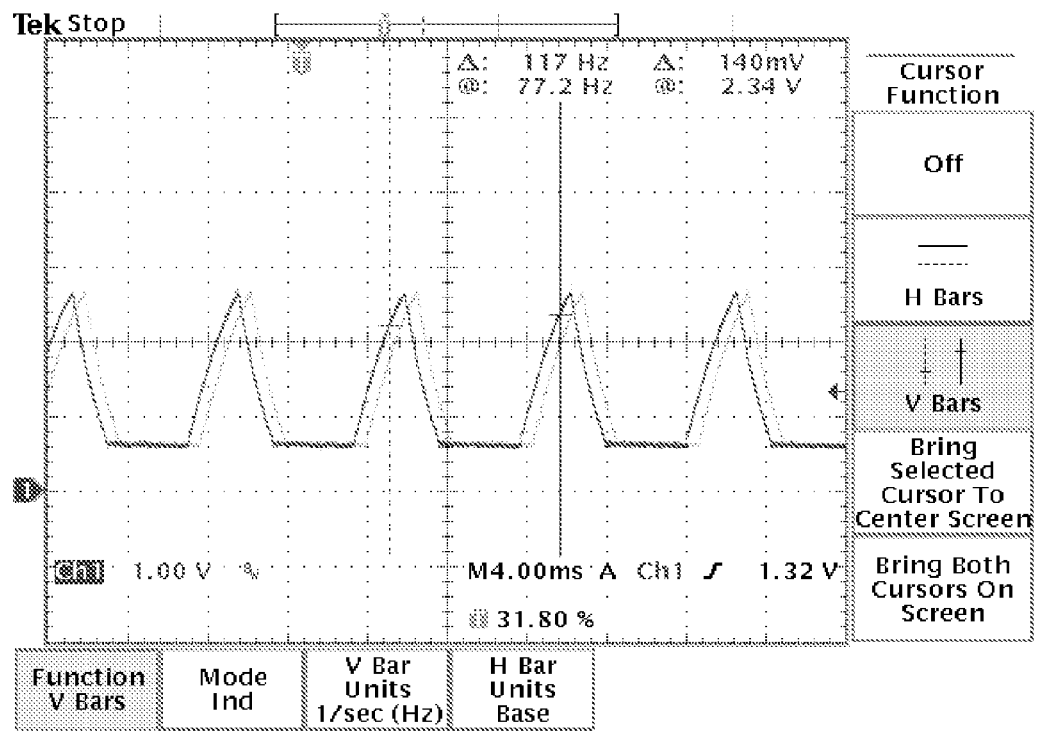

For example, FIGS. 7A and 7B are sample traces of waveforms of a 120VAC line voltage signal and a dimmed 230VAC line voltage signal, respectively. Comparison of FIGS. 7A and 7B shows that the frequency and peaks of the corresponding waveforms are substantially the same, but that slopes of the waveforms are different. In particular, the slopes of the waveform in FIG. 7B are generally steeper than the slopes of the waveform in FIG. 7A. Therefore, by calculating slope (e.g., in operation S450 of FIG. 4), a determination can be made whether the AC line voltage signal is 120VAC or 230VAC, regardless of dimming. Of course, a dimmed 120VAC line voltage signal (not shown), which may have a waveform with a slope similar to that of the dimmed 230VAC line voltage signal in FIG. 7B, would still be distinguishable based on lower peaks. Therefore, in an embodiment, an additional peak comparison (not shown) may be performed if slope calculations are inconclusive.

Figure 8:
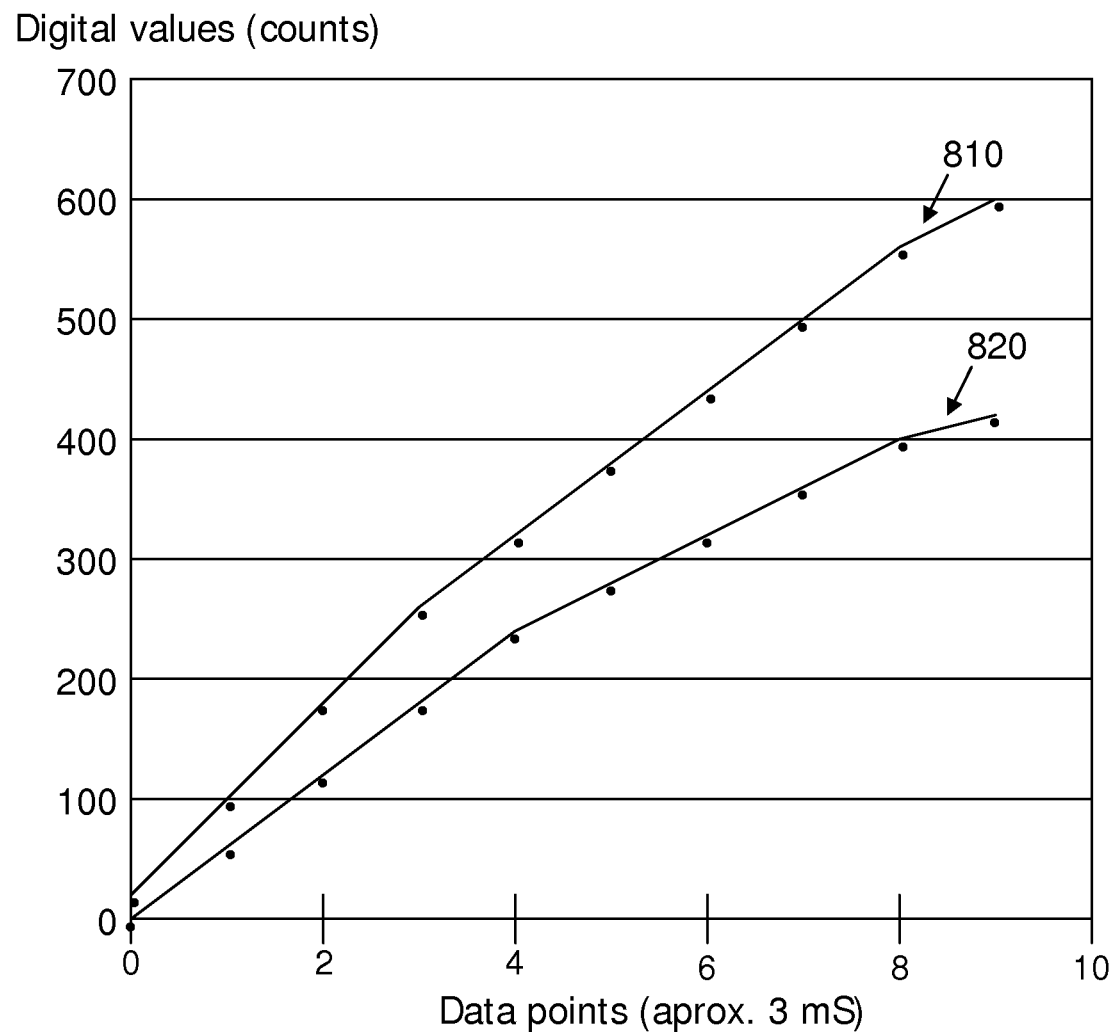
FIG. 8 is a graph showing sample slopes corresponding to waveforms of undimmed and dimmed AC line voltage signals

Accordingly, when it is determined in step S434 that the peak value is not greater than the second threshold value, the process proceeds to step S440, in which reference criteria are selected for slope determination. The selection of the reference criteria are based on the frequency of the AC line voltage signal, which has been previously determined, for example, in operation S420, discussed above. The reference criteria associate a slope or range of slopes at each possible frequency corresponding to the undimmed low voltage value and the dimmed intermediate voltage value, so that the calculated slope may be compared to each. For example, FIG. 8 is a graph showing sample slopes on which reference criteria may be based. Slope 810 corresponds to a rising edge of a waveform in a dimmed 230VAC line voltage signal and slope 820 corresponds to a rising edge of a waveform in a dimmed 120VAC line voltage signal. As discussed above, the higher AC line voltage signal value (slope 810) is steeper.

After selecting the reference criteria, a slope detection algorithm is performed in operation S450 in order to determine the slope corresponding to rising edges of the AC line voltage signal waveform, based on the digital values, e.g., provided by A/D converter 122. The slope detection algorithm of operation S450 is discussed in detail with reference to FIG. 6, which is a flow diagram showing a process of determining slopes of the AC line voltage signal waveform, according to a representative embodiment.

Figure 6:
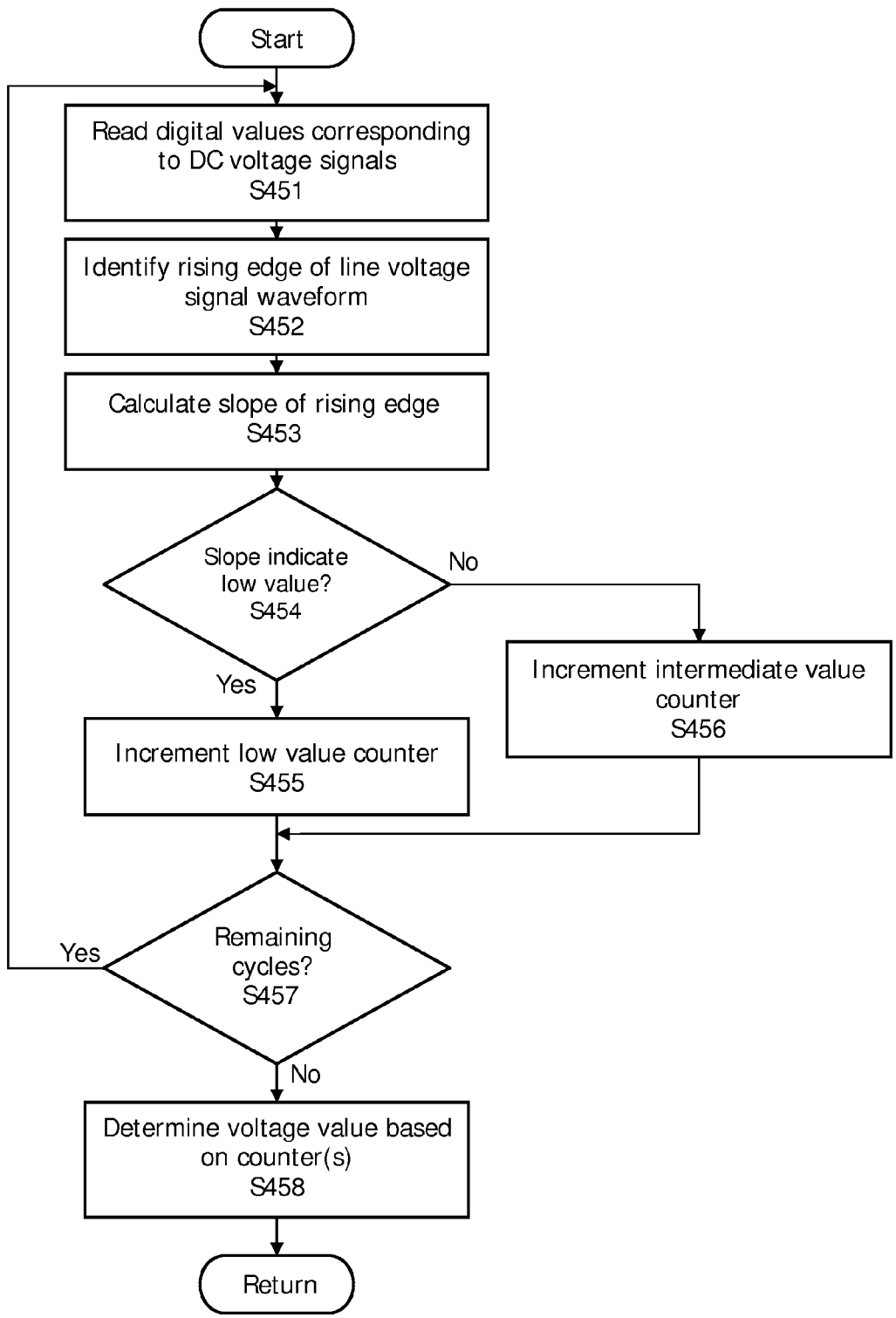
FIG. 6 is a flow diagram showing a process of determining slopes of an AC line voltage signal waveform, according to a representative embodiment.

Referring to FIG. 6, digital values corresponding to the DC voltage signal are read (e.g., from A/D converter 122) in step S451. In an embodiment, the waveform of the AC line voltage signal must be sampled (using the read digital values) over an approximate 2.5 mS time period, because this is the minimum amount of the waveform that is available when ELV dimmers are dimmed to their lowest level. For example, if sampling occurs for more than about 2.5 ms, an AC signal may not exist since it could be chopped by the dimmer. Based on the read digital values, a rising edge of the waveform of the AC line voltage signal is identified in step S452. For example, by monitoring digital values over a period of time, a rising edge may be identified immediately upon identifying digital values that begin to increase following a series of decreasing or unchanged digital values. Once the rising edge of the waveform is identified, the slope of the rising edge is calculated in step S453 using multiple digital values which represent at least a portion of the rising edge. For example, a predetermined number and/or sampling of digital values may be collected, or digital values may be collected over a predetermined period of time. In an embodiment, the slope of the rising edge is calculated by comparing each of the selected digital values corresponding to the rising edge with the preceding digital value. For example, using ten digital values representative of a rising edge of the waveform, an increase of about 50 counts (see 810 of FIG. 8) between adjacent digital values would indicate a 230VAC line voltage, while an increase of about 25 counts (see curve 820 of FIG. 8) between adjacent digital values would indicate a 120VAC line voltage.

In step S454, the calculated slope is compared to the reference criteria selected in step S440, which depend on the frequency of the AC line voltage signal. In the depicted embodiment, the calculated slope is compared only to the reference criteria corresponding to a low voltage value (e.g., 120VAC) for purposes of description. However, it is understood that, in various embodiments, the calculated slope may be compared to either or both of the low voltage and intermediate voltage (e.g., 230VAC) reference criteria, without departing from the scope of the present teachings. When the comparison indicates that the calculated slope corresponds to the low voltage value (step S454: Yes), a low voltage value counter is incremented in step S455, and when the comparison indicates that the calculated slope does not correspond to the low voltage value (step S454: No), an intermediate voltage value counter is incremented in step S456.

In step S457, it is determined whether additional sampling cycles remain. For example, a predetermined number of slopes (e.g., 60) may be calculated for corresponding sets of digital values, or the slope calculations may be repeated and collected over a predetermined period of time (e.g., 450 mS). When additional sampling cycles remain (step S457: Yes), the process returns to the beginning, and steps S451 through S457 are repeated. When no additional sampling cycles remain (step S457: No), the process proceeds to step S458, in which the value of the AC line voltage signal is determined. For example, at least one of the counter values may be compared to a predetermined threshold to determine whether the slopes singly or collectively indicate that the value of the AC line voltage signal is the intermediate voltage value or the low voltage value.

In an embodiment, only the intermediate voltage value counter is compared to a predetermined threshold, selected to indicate whether the value of the AC line voltage signal is the intermediate voltage value, although various embodiments may compare one or both counters, or implement another comparable identification technique. In the example where the predetermined number of slopes being calculated is 60, the predetermined threshold for the intermediate voltage may be 20, in which case the process determines that the value of the AC line voltage signal is the intermediate voltage only when the number of calculated slopes indicating the intermediate voltage value exceeds 20.

After determining the voltage value in step S458 of FIG. 6, the process returns to FIG. 4. Depending on the result, the value of the AC line voltage signal is determined to be one of the low voltage value in step S459 or the intermediate voltage value in step S460. In step S470, the determined voltage value (from one of steps S433, S435, S459 or S460) is compared to the previously stored voltage value, initially retrieved from memory in step S412. When the determined voltage value is the same as the previously stored voltage value (step S470: Yes), the process ends. In this case, the control signal (e.g., output by controller 420) remains unchanged from the setting provided by the initialization process. That is, the control signal continues to be based on the previously stored voltage value. When the determined voltage value is not the same as the previously stored voltage value (step S470: No), the new voltage value of the AC line voltage signal is stored (e.g., in ROM 126) and applied to change the control signal. In response, the PFC controller 130, which receives the control signal from the controller 120, changes the power modulation control signal provided to the solid state light fixture 240 in order to adjust for the changed voltage value.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, FIGS. 4-6 are directed to representative embodiments in which an AC line voltage is determined to be one of three values, a high voltage value, an intermediate voltage value or a low voltage value, which may respectively correspond to 277VAC, 230VAC and 120VAC. However, various additional embodiments may be configured to determine different voltage values or ranges of voltage values (e.g., other than 277VAC, 230VAC and 120VAC) and/or to determine a different number of voltage values (e.g., more or fewer than three) of AC line voltages, without departing from the scope of the present teachings.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Also, the reference numerals are provided in brackets in the claims merely for convenience and is not meant to limit the claims in any way.

Finally, in the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A method for providing universal voltage input to a solid state lighting fixture supplied by an AC line voltage, the method comprising:
    converting an analog voltage signal corresponding to the line voltage to a plurality of digital values indicating a waveform of the line voltage;
    calculating a plurality of slopes corresponding to rising edges of the waveform using select values of the plurality of digital values; and
    determining a value of the line voltage based on the calculated slopes.

2. The method of claim 1, further comprising:
    generating a pulse width modulation (PWM) control signal having a pulse width corresponding to the determined value of the line voltage, wherein a current provided to the solid state lighting fixture is controlled in response to the PWM control signal to maintain a constant power.

3. The method of claim 1, wherein calculating each slope comprises:
    identifying the select values of the corresponding rising edge of the waveform; and determining differences between adjacent select values of the identified select values.

4. The method of claim 3, wherein the calculated slope indicating that the value of the line voltage is about 230VAC is steeper than the calculated slope indicating that the value of the line voltage is about 120VAC.

5. The method of claim 1, further comprising:
identifying a maximum digital value of the plurality of digital values corresponding to a peak of the waveform; and
comparing the maximum digital value to a plurality of predetermined voltage thresholds prior to calculating the slopes corresponding to the rising edges of the waveform.

6. The method of claim 5, further comprising:
determining that the value of the line voltage is about 277VAC when the maximum digital value exceeds a first voltage threshold.

7. The method of claim 6, further comprising:
determining that the value of the line voltage is in a range of about 220VAC to about 240VAC when the maximum digital value exceeds a second voltage threshold, the second voltage threshold being lower than the first voltage threshold.

8. The method of claim 7, further comprising:
determining that the value of the line voltage is one of about 230VAC or about 120VAC, depending on the calculated slopes corresponding to the rising edges of the waveform, when the maximum digital value does not exceed the first or second voltage thresholds.

9. The method of claim 1, further comprising:
retrieving a previous value of the line voltage from a memory; and
controlling the solid state lighting fixture according to the previous value of the line voltage at least while calculating the slopes corresponding to the rising edges of the waveform.

10. The method of claim 1, further comprising:
identifying a frequency of the waveform of the line voltage; and
determining the value of the line voltage based on the identified frequency, as well as the calculated slopes.

11. The method of claim 1, wherein determining the value of the line voltage based on the calculated slopes comprises:
comparing each calculated slope to reference criteria to determine whether the calculated slope is associated with a 120VAC value of the line voltage;
incrementing a 120VAC counter when the calculated slope is determined to be associated with the 120VAC value of the line voltage; and
incrementing a 230VAC counter when the calculated slope is determined not to be associated with the 120VAC value of the line voltage,
wherein the value of the line voltage is determined to be about 230VAC when the 230VAC counter exceeds a predetermined threshold, and to be about 120VAC when the 230VAC counter does not exceed the predetermined threshold.

12. A device for providing universal voltage input to a solid state lighting fixture having a plurality of light-emitting diodes (LEDs), the device comprising:
an analog-to-digital converter configured to receive an analog voltage signal corresponding to an AC line voltage signal having a waveform and to convert the analog voltage signal to digital values indicating the waveform; and
a processor configured to execute an algorithm for reading select digital values provided by the analog-to-digital converter corresponding to a rising edge of the waveform, calculating a slope based on the select digital values, and determining a value of the line voltage based on the calculated slope.

13. The device of claim 12, further comprising:
a pulse width modulation (PWM) generator configured to generate a PWM control signal having a pulse width corresponding to the determined value of the line voltage.

14. The device of claim 13, wherein the pulse width of the PWM control signal is inversely proportional to the determined value of the line voltage.

15. The device of claim 13, further comprising:
a power factor correction (PFC) controller configured to receive the PWM control signal and to generate a power modulation control signal for controlling lengths of an on-time and an off-time of the plurality of LEDs based on the received PWM control signal.

16. The device of claim 13, further comprising:
a memory configured to store a previously determined value of the line voltage, wherein the PWM generator is further configured to generate the PWM control signal having an initial pulse width corresponding to the stored previously determined value of the line voltage, at least while the processor executes the algorithm to determine the value of the line voltage based on the calculated slope.

17. The device of claim 12, wherein the processor is further configured to identify a maximum digital value provided by the analog-to-digital converter corresponding to a peak of the waveform and to compare the maximum digital value to a plurality of voltage thresholds prior to reading the select digital values corresponding to the rising edge of the waveform.

18. The device of claim 12, further comprising:
a voltage divider circuit configured to receive the AC line voltage signal and to provide the analog voltage signal to the analog-to-digital converter based on the received AC line voltage signal, wherein the analog voltage signal comprises a DC voltage signal.

19. A computer readable medium storing a program, executable by a computer processor, for providing universal voltage input to a solid state lighting fixture supplied by an AC line voltage, the computer readable medium comprising:
a receiving code segment for receiving a plurality of digital values indicating a waveform of the line voltage;
a calculating code segment for calculating a plurality of slopes corresponding to rising edges of the waveform using select values of the plurality of digital values;
a determining code segment for determining a value of the line voltage based on the calculated slopes; and
a control signal code segment for adjusting a control signal based on the determined value of the line voltage (S318), the control signal adjusting a power provided to the solid state lighting fixture.

20. The computer readable medium of claim 19, wherein the control signal comprises a pulse width modulation (PWM) control signal having a pulse width corresponding to the determined value of the line voltage.

* * * * *